US012719752B2

(12) United States Patent
Targali et al.

(10) Patent No.: US 12,719,752 B2
(45) Date of Patent: Aug. 25, 2026

(54) SYSTEMS AND METHODS FOR AUTOMATED SECURE NETWORK FUNCTION PROVISIONING IN A WIRELESS NETWORK

(71) Applicant: Verizon Patent and Licensing Inc., Basking Ridge, NJ (US)

(72) Inventors: Yousif Targali, Sammamish, WA (US); Shankar Venkatraman, San Jose, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 18/464,412

(22) Filed: Sep. 11, 2023

(65) Prior Publication Data

US 2025/0088424 A1 Mar. 13, 2025

(51) Int. Cl.

| | |
|---|---|
| ***G06F 15/177*** | (2006.01) |
| ***H04L 41/0806*** | (2022.01) |
| ***H04L 41/0895*** | (2022.01) |
| ***H04W 12/069*** | (2021.01) |

(52) U.S. Cl.

CPC ...... *H04L 41/0895* (2022.05); *H04L 41/0806* (2013.01); *H04W 12/069* (2021.01)

(58) Field of Classification Search

CPC ........... H04L 41/0895; H04L 41/0806; H04W 12/069

USPC ........................................................ 709/222

See application file for complete search history.

(56) References Cited

U.S. PATENT DOCUMENTS

| | | | | |
|---|---|---|---|---|
| 2018/0070300 A1* | 3/2018 | Kim | ...................... | H04W 48/08 |
| 2022/0345484 A1* | 10/2022 | Drozd | ..................... | H04W 4/40 |
| 2024/0022895 A1* | 1/2024 | Shahdad | ............... | H04W 48/16 |

OTHER PUBLICATIONS

Aboba et al., “Extensible Authentication Protocol (EAP),” Network Working Group Request for Comments 3748 (2004).

LAN/MAN Standards Committee, “IEEE Standard for Local and Metropolitan Area Networks—Port-Based Network Access Control,” IEEE Std 802.1X-2020, IEEE Standards Association (2020).

O-RAN Alliance, “O-RAN Working Group 1 (Use Cases and Overall Architecture); O-RAN Architecture Description,” O-RAN. WG1.OAD-R003-v09.00 (Mar. 2023).

* cited by examiner

*Primary Examiner* — Vivek Srivastava
*Assistant Examiner* — Karina J Garcia-Ching

(57) ABSTRACT

A system described herein may maintain a set of policies associated with accessing a radio access network (“RAN”), may receive a request for a particular network function (“NF”) to access the RAN, and may determine, based on the set of policies and information included in the request, whether to grant the request to access the RAN. The system may establish, when determining that the request should be granted, connectivity between the particular NF and the RAN, where establishing the connectivity includes assigning a particular address to the particular NF, routing traffic, addressed to the particular address, to the particular NF, routing traffic, received from the particular NF, to the RAN. The system may forgo establishing connectivity between the particular NF and the RAN when determining that the request should not be granted. The RAN may include an Open RAN (“O-RAN”).

20 Claims, 11 Drawing Sheets

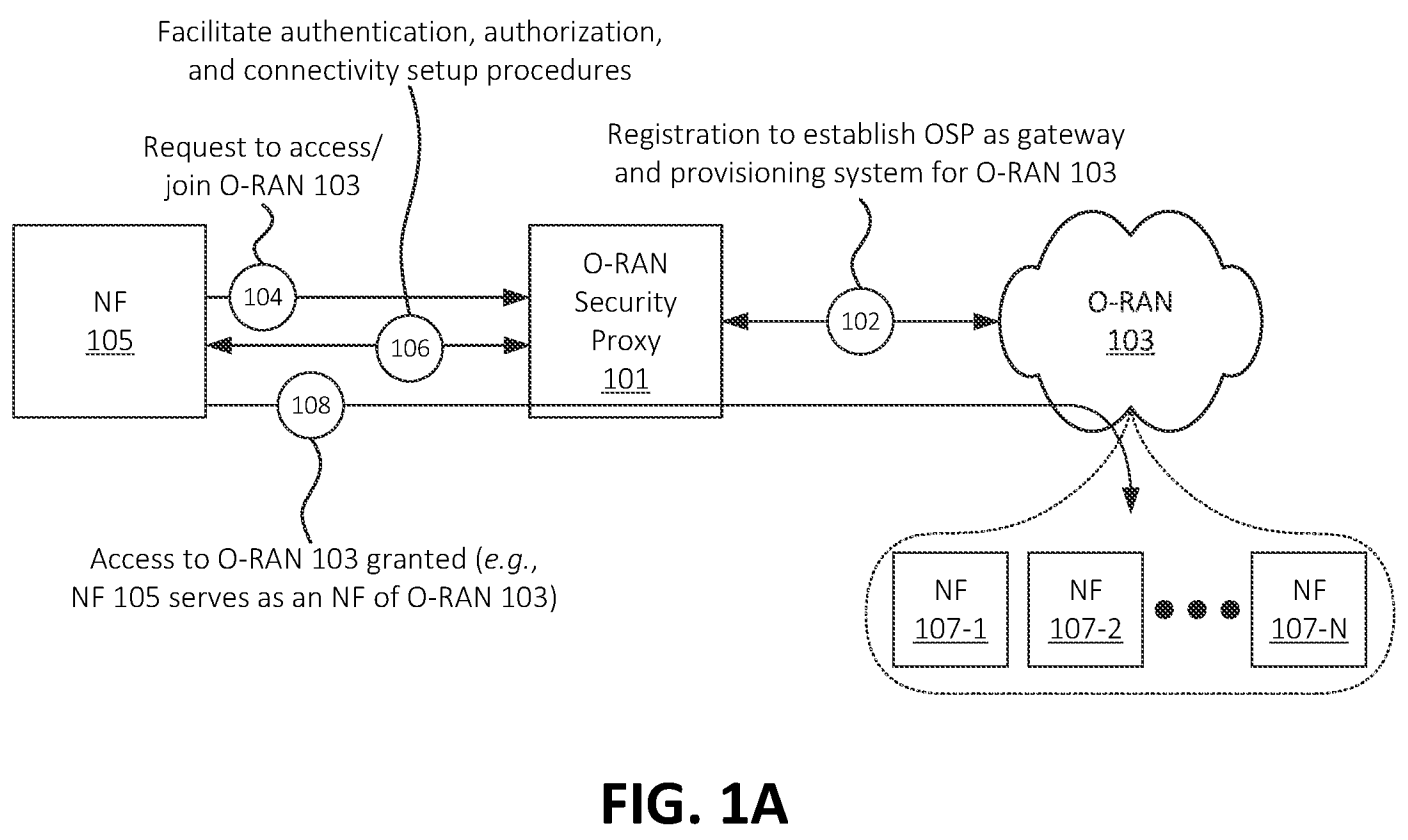

Facilitate authentication, authorization, and connectivity setup procedures

Request to access/ join O-RAN 103

Registration to establish OSP as gateway and provisioning system for O-RAN 103

NF 105

104

106

108

O-RAN Security Proxy 101

102

O-RAN 103

NF 107-1

NF 107-2

NF 107-N

Access to O-RAN 103 granted (*e.g.*, NF 105 serves as an NF of O-RAN 103)

FIG. 1A

SYSTEMS AND METHODS FOR AUTOMATED SECURE NETWORK FUNCTION PROVISIONING IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may include radio access networks ("RANs"), which include wireless network infrastructure equipment such as base stations, antennas, radios, etc. with which UEs can communicate, and which route traffic between such UEs and a core network that provides connectivity with the Internet or other networks. RANs may be implemented in a virtualized and/or containerized environment, in which hardware resources are provisioned and/or configured to perform various functions of the RAN. One such implementation may include an Open RAN ("O-RAN") architecture.

BRIEF DESCRIPTION OF THE DRAWINGS

FIGS. 1A-1C illustrate an example overview of one or more embodiments described herein;

DETAILED DESCRIPTION OF EXAMPLE EMBODIMENTS

Figure 1B:
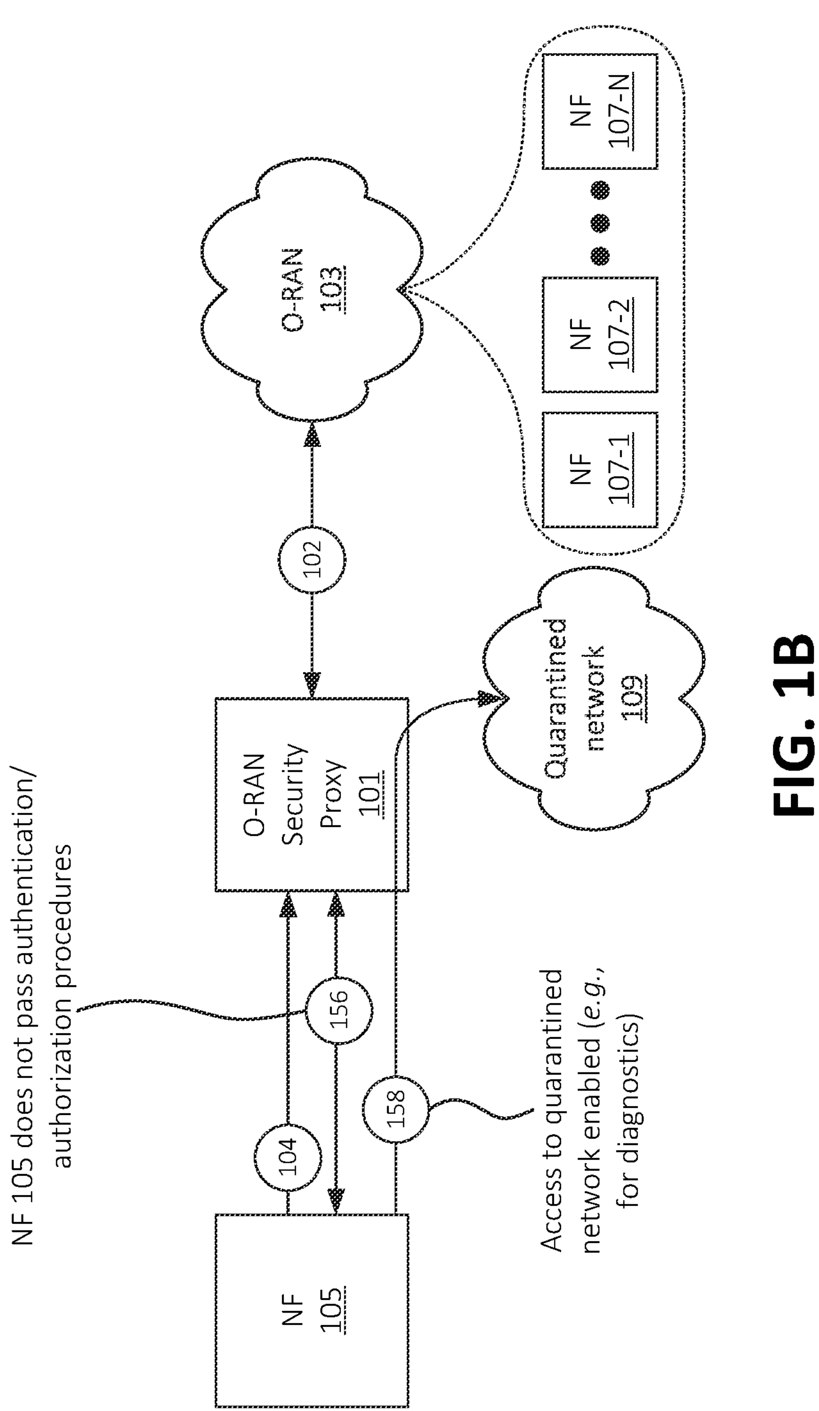

The following detailed description refers to the accompanying drawings. The same reference numbers in different drawings may identify the same or similar elements.

In a virtualized and/or containerized implementation of a RAN (e.g., an O-RAN architecture or other suitable type of implementation), various containers, virtual machines, etc. may perform functionality of different network functions ("NFs") of the RAN. Such functionality may include aggregating traffic received wirelessly from UEs, routing traffic to a core network, managing wireless access to the RAN, and/or other suitable functionality. Different entities (e.g., vendors, manufacturers, operators, etc.) may provide or configure different NFs of the RAN. In this manner, a network operator of the RAN may have the flexibility to select NFs provided by different entities to implement the RAN, in order to maximize or optimize objectives such as performance, reliability, cost, or the like.

Embodiments described herein provide for a simplified procedure for adding NFs to a RAN, thus removing the need for an operator of the RAN to individually perform various operations associated with adding NFs to the RAN in a piecemeal fashion. Such operations may include configuring communication information (e.g., Internet Protocol ("IP") addresses or other suitable type of communication information) for the NF, generating or providing authentication information for the NF, or other suitable operations. In this manner, embodiments described herein may simplify the management and/or configuration of the RAN, as well as enhancing scalability of the RAN.

As shown in FIG. 1A, for example, some embodiments may provide O-RAN Security Proxy ("OSP") 101, which may provide some or all of the operations described herein to simplify the addition of an NF to O-RAN 103. Examples herein are provided in the context of the RAN being implemented by an O-RAN architecture (e.g., O-RAN 103). In practice, similar concepts may apply to some other type of RAN or network that is implemented in a containerized manner (e.g., in which virtual machines, virtualized instances, containers, etc. implement various NFs of the RAN). As discussed herein, OSP 101 may provide functionality related to modifying parameters of O-RAN 103, such as securely adding NFs (i.e., example NF 105 in the discussion below) to O-RAN 103, which may include configuring communication information to facilitate communications between NF 105 and O-RAN 103 (e.g., between NF 105 and NFs that have been previously added to O-RAN 103, such as example NFs 107-1, 107-2, 107-N, etc.), verifying that NF 105 is authorized to be added to O-RAN 103, authenticating NF 105, provisioning networking and discovery services such as Dynamic Host Configuration Protocol ("DHCP") services, Domain Name System ("DNS") services, authentication, authorization, etc.

In some embodiments, OSP 101 may register (at 102) with O-RAN 103 to establish O-RAN 103 as a gateway and/or provisioning system for O-RAN 103. For example, OSP 101 may communicate with a Service Management and Orchestration ("SMO") framework of O-RAN 103 and/or some other suitable device or system of O-RAN 103 that manages access, routing, or other administrative and/or orchestration functions of O-RAN 103. O-RAN 103 may authenticate OSP 101 and/or otherwise verify that O-RAN 103 is authorized to serve as a security proxy for O-RAN 103 (e.g., to authorize and/or authenticate NFs requesting access to O-RAN 103 and to provide connectivity information to such NFs).

Registering with O-RAN 103 may include OSP 101 receiving connectivity or address information indicating IP addresses or other identifiers that OSP 101 may assign to NFs requesting access to O-RAN 103. For example, OSP 101 may implement a DHCP functionality or other suitable functionality, by which OSP 101 may assign IP addresses to NFs requesting access to O-RAN 103. As discussed above, OSP 101 may also provide DNS discovery services, authentication services, authorization services, etc.

OSP 101 may also receive, as part of the registration procedure (at 102), security, authorization, and/or authentication information. Such information may indicate, for example, criteria, identifiers, or other attributes indicating NFs that are authorized to access O-RAN 103. Such criteria, identifiers, etc. may indicate types of NFs that are authorized or not authorized to access O-RAN 103. "Types" of NFs may refer to specific functions or sets of functions, such as Distributed Unit ("DU"), Central Unit ("CU"), etc. As another example, the criteria and/or identifiers may include an identifier of a vendor or other provider of a given NF, a serial number or other unique identifier of a given NF, a geographical location of hardware resources that implement a given NF, Quality of Service ("QoS") or Service Level Agreement ("SLA") information associated with a given NF (e.g., guarantees or SLAs provided by a given NF, such as minimum throughput, maximum latency, etc.), and/or other types of criteria, identifiers, or attributes.

In some embodiments, OSP 101 may receive some or all of the above-described information, or other information, in a procedure separate from the registration procedure. In some embodiments, OSP 101 may receive some or all of the above-described information, or other suitable information, from a device or system other than O-RAN 103.

OSP 101 may, after registering (at 102) with O-RAN 103, be available as a gateway, portal, etc. via which NFs may be registered and configured for access to O-RAN 103 (e.g., to act as NFs that perform functionality of O-RAN 103 and that communicate with other NFs 107 of O-RAN 103). For example, O-RAN 103 may be accessible via a network, such as the Internet, a private network (e.g., a Local Area Network ("LAN"), an enterprise network, etc.), or some other suitable communication pathway. In some embodiments, OSP 101 may register (at 102) with multiple O-RANs 103 or multiple instances of O-RAN 103. In this manner, OSP 101 may act as a security proxy for multiple O-RANs 103 or instances of O-RAN 103.

OSP 101 may receive (at 104), via such communication pathway a request to access (e.g., join) O-RAN 103. The request may be associated with NF 105, inasmuch as the request may be a request for NF 105 to access O-RAN 103. NF 105 may be implemented by, for example, a "bare metal" machine, a virtual machine, a container in a containerized and/or cloud computing system, etc. In some embodiments, NF 105 may be, may include, may be implemented by, etc. a containerized and/or cloud-native NF ("CNF"), a virtualized NF ("VNF"), or the like. In some embodiments, the request may be received (at 104) from NF 105 via a network interface or other suitable communication pathway of OSP 101. In some embodiments, the request may be received from some other device or system, such as an administrator or operator system associated with NF 105. For example, NF 105 may have been provisioned, configured, etc. by such administrator or operator system, and the administrator or operator system may communicate with OSP 101 to request access to O-RAN 103 on behalf of NF 105.

In some embodiments, the request (at 104) may include an identifier of O-RAN 103 or other information based on which OSP 101 may identify that the request is associated with a particular O-RAN 103 (e.g., in situations where OSP 101 has registered with multiple O-RANs 103). In this example, assume that OSP 101 determines that O-RAN 103, shown in FIG. 1, is the particular O-RAN with which the request (at 104) is associated.

The request (at 104) may include attributes of NF 105, such as a type of NF (e.g., an indication of one or more functions of O-RAN 103 that NF 105 is able to perform), a geographical location of NF 105 (e.g., a location in which hardware resources that implement NF 105 are located), an operator or provider of NF 105 (e.g., a particular network operator, a vendor, etc.), or other suitable attributes. In some embodiments, the request may include authentication information associated with NF 105 and/or of an operator or provider of NF 105, such as one or more authentication tokens, keys, passwords, etc. Such authentication information may have been established with OSP 101 at a prior time, such as a registration procedure between OSP 101 and the operator or provider of NF 105. Such information may be used by OSP 101 to determine whether NF 105 is associated with an authorized entity.

In some embodiments, the request may specify particular NFs 107, or types of NFs 107, that NF 105 is requesting to communicate with. For example, NF 105 may perform particular functions that include communicating with one type of NF (e.g., a first type that is associated with NF 107-1), and that do not include communicating with another type of NF (e.g., a second type of NF associated with NF 107-2).

Figure 2:
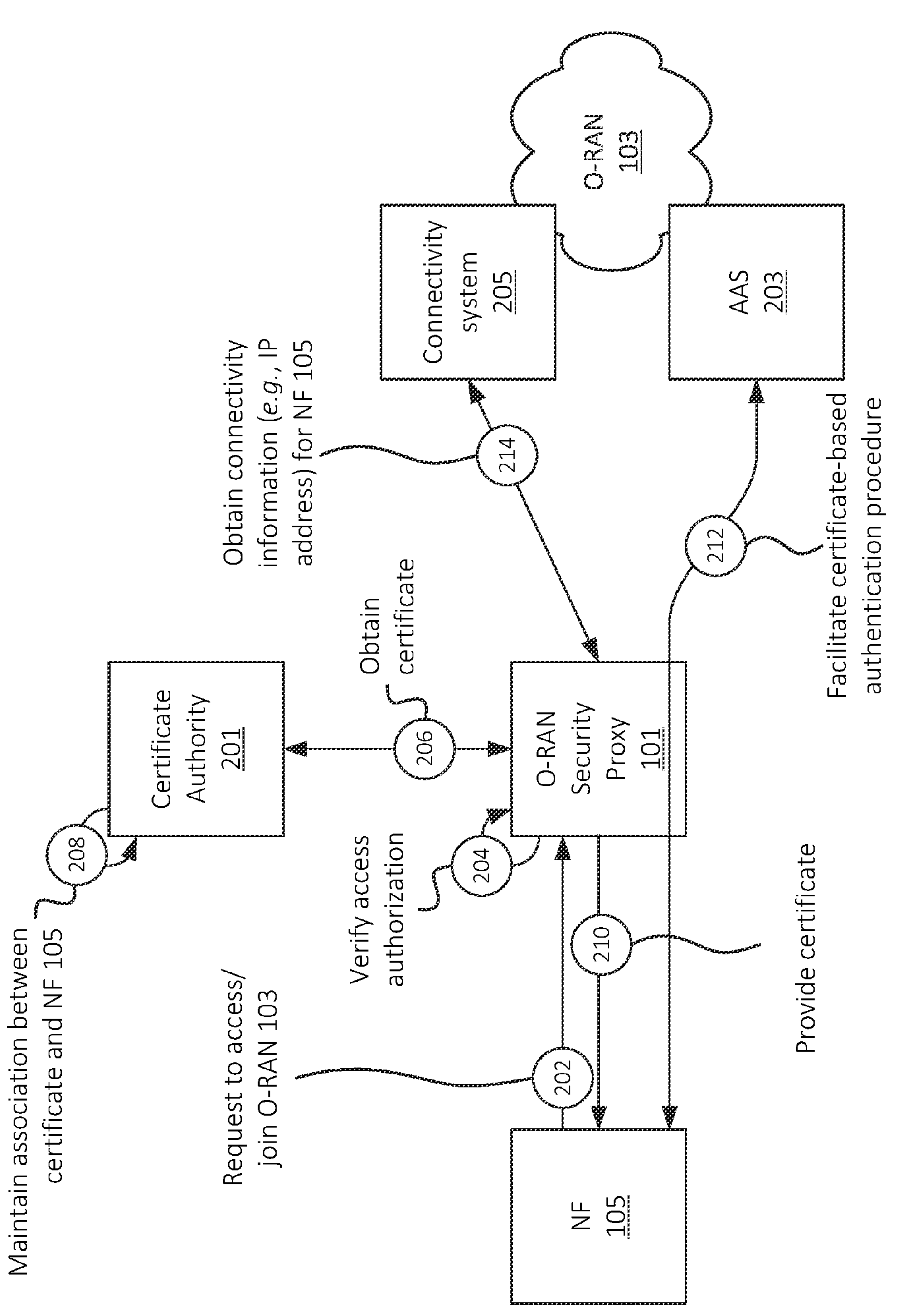
FIGS. 2 and 3 illustrate example operations for authenticating and authorizing a network function ("NF") for access to a RAN, in accordance with some embodiments.

OSP 101 may, based on the request, facilitate (at 106) authentication, authorization, and/or connectivity setup procedures with respect to NF 105. FIG. 2, discussed below, provides further details on such procedures, in accordance with some embodiments. Generally, OSP 101 may verify that NF 105 is authorized to join O-RAN 103 based on information provided (e.g., as discussed above with respect to the request at 104) by NF 105 as well as based on policies, criteria, etc. associated with O-RAN 103 (e.g., as discussed above with respect to the registration (at 102) of OSP 101 with O-RAN 103). OSP 101 may verify, for instance, that NF 105 is of a particular type that is authorized to join O-RAN 103, may verify that NF 105 is associated with a particular operator or vendor that is authorized for O-RAN 103, may verify that NF 105 is located in a particular location that is authorized for O-RAN 103, etc.

OSP 101 may also configure connectivity and/or routing for NF 105, based on determining that NF 105 is authorized to join O-RAN 103. For example, OSP 101 may assign an IP address in an address space or address pool used by internal routing mechanisms of O-RAN 103. The assignment may include providing the IP address to NF 105, so that NF 105 may include its own IP address when communicating with NFs 107 of O-RAN 103. Additionally, or alternatively, assigning the IP address may include maintaining, by OSP 101, information associating NF 105 with such IP address. In such implementations, OSP 101 may perform Network Address Translation ("NAT") or some other suitable technique to route communications to and/or from NF 105 using such IP address. In some embodiments, assigning the IP address to NF 105 may include OSP 101 indicating, to O-RAN 103 (e.g., to an SMO framework or other routing mechanism of O-RAN 103), that communications directed to the IP address should be routed to OSP 101, and OSP 101 may proceed to forward such communications to NF 105.

In this manner, access to O-RAN 103 may be granted (at 108) to NF 105, and OSP 101 may act as a communication and/or routing proxy between NF 105 and O-RAN 103. As such, NFs 107 of O-RAN 103 may be able to communicate with NF 105 via OSP 101. In situations where NF 105 is authorized to communicate with some NFs 107 of O-RAN 103, but not with all NFs 107 of O-RAN 103, OSP 101 may further configure internal routing policies of O-RAN 103 (and/or may request the configuration of such policies by an SMO framework of O-RAN 103) to indicate that NF 105 is permitted to communicate with some NFs 107 of O-RAN 103 and is not permitted to communicate with one or more other NFs 107 of O-RAN 103. Additionally, or alternatively, OSP 101 may maintain such information locally, and may forward or reject traffic to and/or from NF 105 based on which NF(s) 107 the traffic is sent to and/or received from. As discussed above, the operations described above may be a simplified configuration procedure from the standpoint of an operator or provider of NF 105, inasmuch as such operator or provider need not participate in network connectivity procedures to add NF 105 to O-RAN 103, and may further be able to use universal or general authentication credentials (e.g., credentials associated with the operator or provider) to obtain authorization for NF 105, without the need for obtaining specific credentials for NF 105.

FIG. 1B illustrates an example scenario in which NF 105 is not authorized to access O-RAN 103. As shown, OSP 101 may receive (at 104) a request to add NF 105 to O-RAN 103. In this example, OSP 101 may determine (at 156) that NF 105 is not authorized to access O-RAN 103, which may include determining that NF 105 (or an operator or provider thereof) has not passed one or more authentication procedures, that NF 105 is of an unauthorized type, etc.

Accordingly, OSP 101 may not provide connectivity information that facilitates communications between NF 105 and O-RAN 103 (e.g., NFs 107 of O-RAN 103). In accordance with some embodiments, OSP 101 may instead provide (at 158) access to quarantine network 109. Quarantine network 109 may be, for example, a separate network from O-RAN 103. For instance, quarantine network 109 may implement a separate address space as O-RAN 103, may be implemented by different hardware resources than O-RAN 103, may be firewalled from O-RAN 103, and/or may otherwise may be separate from or inaccessible by O-RAN 103. Quarantine network 109 may be, for example, a private network, an enterprise network, or the like.

OSP 101 may assign an IP address to NF 105 in a separate address space than is used for O-RAN 103, to facilitate communications between NF 105 and one or more devices or systems that are connected to quarantine network 109. Such connectivity may be used for, for example, diagnostics, reconfiguration of NF 105, or other operations that may be performed to determine why access to O-RAN 103 was denied for NF 105 or other suitable operations.

Figure 1C:
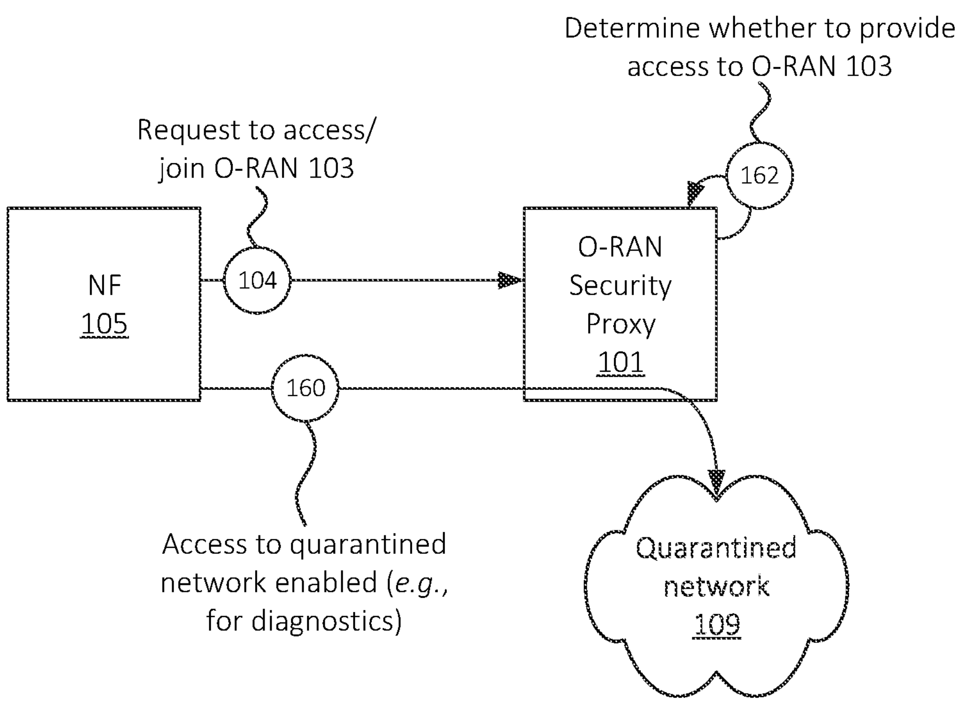

Although the access (at 158) to quarantine network 109 is discussed above as being performed in response to a determination (at 156) that NF 105 should not be granted access to O-RAN 103 (e.g., should not be allowed to join O-RAN 103), OSP 101 may provide access to quarantine network 109 prior to determining (e.g., at 106 and/or 156) whether NF 105 is authorized to access O-RAN 103. For example, as shown in FIG. 1C, OSP 101 may receive (at 104) a request for NF 105 to access and/or join O-RAN 103, and may provide (at 160), based on receiving the request, access to quarantine network 109. OSP 101 may subsequently, or concurrently, proceed to determine (at 162) whether to provide access to O-RAN 103. In this manner, NF 105 may immediately be able to be analyzed (e.g., via quarantine network 109) for diagnostic purposes, configuration purposes, or other suitable purposes. In situations where NF 105 is authorized for access to O-RAN 103, OSP 101 may remove or revoke access for NF 105 to quarantine network 109 (e.g., NF 105 may be connected to O-RAN 103 and not quarantine network 109 in such situations). Additionally, or alternatively, NF 105 may retain connectivity to quarantine network 109 while also being connected to O-RAN 103.

FIG. 2 illustrates an example of the addition of NF 105 to O-RAN 103, which may include authenticating NF 105, verifying authorization of NF 105 to access or join O-RAN 103, and the establishment of connectivity between NF 105 and O-RAN 103. As shown, OSP 101 may receive (at 202) a request to access (e.g., join) O-RAN 103. As discussed above, the request may be received from NF 105 or some other suitable device or system that requests access on behalf of NF 105. As discussed above, the request may include attributes of NF 105, an identifier of NF 105, an identifier or attributes of the requestor, etc. As also discussed above, OSP 101 may verify (at 204) authorization of NF 105 to access O-RAN 103 based on policies maintained by OSP 101 (e.g., as received from O-RAN 103 or some other suitable source), such as by comparing the attributes, identifier, etc. of NF 105 and/or the requestor to the policies. In some embodiments, OSP may verify (at 204) authorization of NF 105 in some other manner, such as by requesting confirmation from Authentication/Authorization System ("AAS") 203 or some other suitable device or system.

Assuming that OSP 101 determines (at 204) that NF 105 is authorized to access O-RAN 103, OSP 101 may obtain (at 206) a certificate from Certificate Authority ("CA") 201. As part of obtaining the certificate, OSP 101 may provide, to CA 201, an identifier of NF 105, based on which CA 201 may maintain (at 208) an association between the certificate and NF 105. The certificate may include, or may be based on, a cryptographic key or some other suitable type of security mechanism. In some embodiments, in addition to or in lieu of a certificate, OSP 101 and/or CA 201 may generate an asymmetric key pair (e.g., including a public key and a private key), and OSP 101 may obtain the private key from CA 201. Additionally, or alternatively, CA 201 may provide the private key to a Key Escrow Server ("KES") or other suitable device or system, and may provide a link, Uniform Resource Locator ("URL"), or other suitable locator information to OSP 101, based on which OSP 101 may obtain the private key from the KES and/or may provide such locator information to NF 105, based on which NF 105 may obtain the private key from the KES.

OSP 101 may provide (at 210) the certificate to NF 105. Additionally, or alternatively, as discussed above, OSP 101 may provide (at 210) a private key to NF 105, and/or may provide information to NF 105 based on which NF 105 may obtain such private key (e.g., locator information associated with a KES that maintains the private key).

Once NF 105 receives the certificate, private key, etc., NF 105 may utilize the certificate and/or the private key to participate (at 212) in a certificate-based authentication procedure with O-RAN 103 (e.g., with AAS 203 of O-RAN 103). Additionally, or alternatively, in some embodiments, OSP 101 and NF 105 may perform the authentication procedure without communicating with O-RAN 103 (e.g., without communicating with AAS 203 or some other device or system of O-RAN 103). In some embodiments, the certificate-based authentication procedure may be or may include an Institute of Electrical and Electronics Engineers ("IEEE") 802.1X procedure, an Extensible Authentication Protocol ("EAP") procedure, or other suitable type of authentication procedure.

In such embodiments, OSP 101 may provide an authentication and/or authorization token or other indication to O-RAN 103, indicating that the authentication procedure has been completed (e.g., that NF 105 has been authenticated and/or authorized). An example of the certificate-based authentication and/or authorization procedure, in accordance with some embodiments, is described below with respect to FIG. 3. Generally, the certificate-based authentication procedure may be used by O-RAN 103 to verify that NF 105 is the same NF 105 that has been verified by OSP 101, thus preventing "spoofing" or other types of security compromises.

Once NF 105 has been authenticated and/or authorized (at 212), OSP 101 may obtain or generate (at 214) connectivity information for NF 105. For example, as discussed above, OSP 101 may request an IP address or pool of IP addresses from connectivity system 205 of O-RAN 103 (e.g., a DHCP server or other suitable device or system), and may assign such IP address to NF 105. Additionally, or alternatively, as discussed above, OSP 101 may have previously obtained an IP address, pool of IP addresses, subnet, etc. from connectivity system 205 and may assign one or more such IP addresses to NF 105. In some embodiments, OSP 101 may provide an indication, to connectivity system 205 or some other suitable device or system of O-RAN 103, indicating that the particular IP address has been assigned to NF 105, or that such IP address is otherwise no longer available to be assigned (e.g., is now in use). As discussed above, the connectivity information may be used to facilitate communications between NF 105 and O-RAN 103 (e.g., one or more NFs 107 of O-RAN 103).

Figure 3:
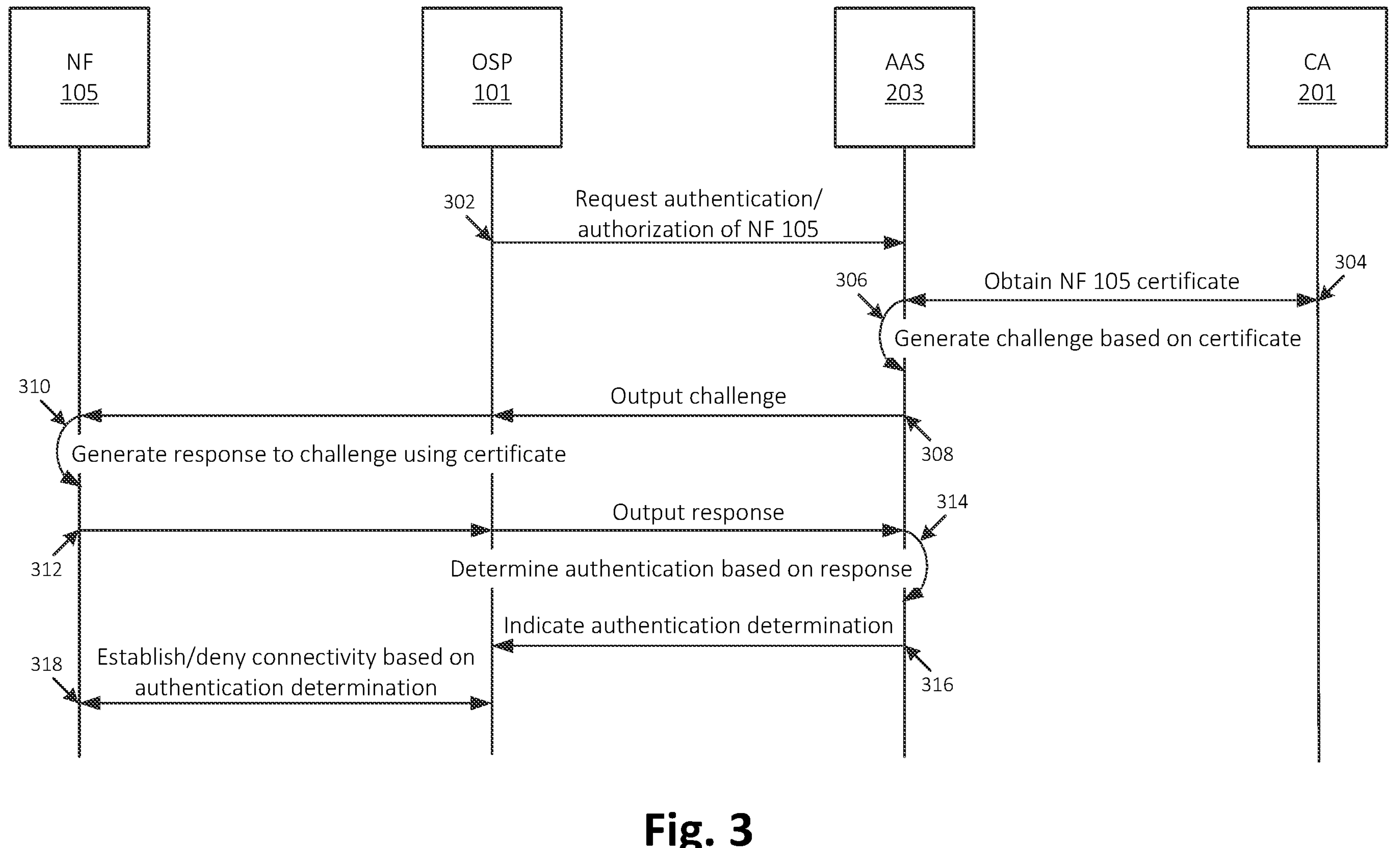

FIG. 3 illustrates an example of a certificate-based authentication procedure that may be used (e.g., by AAS 203, OSP 101, etc.) to authenticate NF 105. As noted above, such procedure may be performed in response to a registration request (e.g., at 104) associated with NF 105. In this example, some operations may be performed by OSP 101 and some operations may be performed by AAS 203. As discussed above, in some embodiments, some of the operations described above with respect to AAS 203 may be performed by OSP 101 in lieu of by AAS 203. As shown, OSP 101 may request (at 302) authentication and/or authorization of NF 105. The request may include an identifier of NF 105 or other suitable information based on which NF 105 may be identified. For example, the identifier may be used to indicate the particular NF 105 to be authenticated and/or authorized. AAS 203 may obtain (at 304) a certificate associated with the particular NF 105 from CA 201. As discussed above, for instance, CA 201 may maintain information associating the certificate with the particular NF 105. In this manner, CA 201 may maintain multiple distinct certificates that are associated with multiple different NFs 105, and may maintain information associating identifiers of the different NFs 105 with respective certificates.

AAS 203 may generate (at 306) a challenge based on the certificate. For example, AAS 203 may encrypt or otherwise a message or other type of information using the certificate. For example, AAS 203 may perform a cryptographic function that takes the message and the certificate as input, and generates the challenge as output. Additionally, or alternatively, AAS 203 may encrypt the message using a public key of an asymmetric key pair, as discussed above.

AAS 203 may output (at 308) the challenge to OSP 101. For example, AAS 203 may indicate that the challenge is associated with the authentication request provided (at 302) by OSP 101. In this manner, OSP 101 may identify that the challenge should be provided to NF 105.

NF 105 may generate (at 310) a response to the challenge. For example, NF 105 may decrypt the challenge using the certificate and/or the private key associated with the asymmetric key pair. NF 105 may output (at 312) a response to the challenge (e.g., the decrypted challenge) to OSP 101, which may forward such response to AAS 203. AAS 203 may determine (at 314) whether NF 105 has passed the authentication or not. For example, if the response includes the original unencrypted message (e.g., based on which the challenge was generated), or otherwise matches an expected response, then AAS 203 may determine that NF 105 is authenticated. On the other hand, if the response does not match an expected response, then AAS 203 may determine that NF 105 is not authenticated. AAS 203 may indicate (at 316) to OSP 101 whether NF 105 has been authenticated. OSP 101 may establish or deny (at 318) connectivity to AAS 203 based on the authentication response. For example, as discussed above, if NF 105 has been properly authenticated, then OSP 101 may continue to obtain an IP address for NF 105 in an address space associated with O-RAN 103, or otherwise facilitate connectivity between NF 105 and O-RAN 103. If on the other hand, NF 105 has not been authenticated, then OSP 101 may establish connectivity between NF 105 and quarantine network 109 to facilitate diagnostics, configuration modifications, etc. As discussed above, in some embodiments, OSP 101 may establish connectivity between NF 105 and quarantine network 109 prior to some or all of the operations discussed in FIG. 3, and/or may provide for connectivity between NF 105 and quarantine network 109 regardless of whether NF 105 has been authenticated (at 314).

Figure 4:
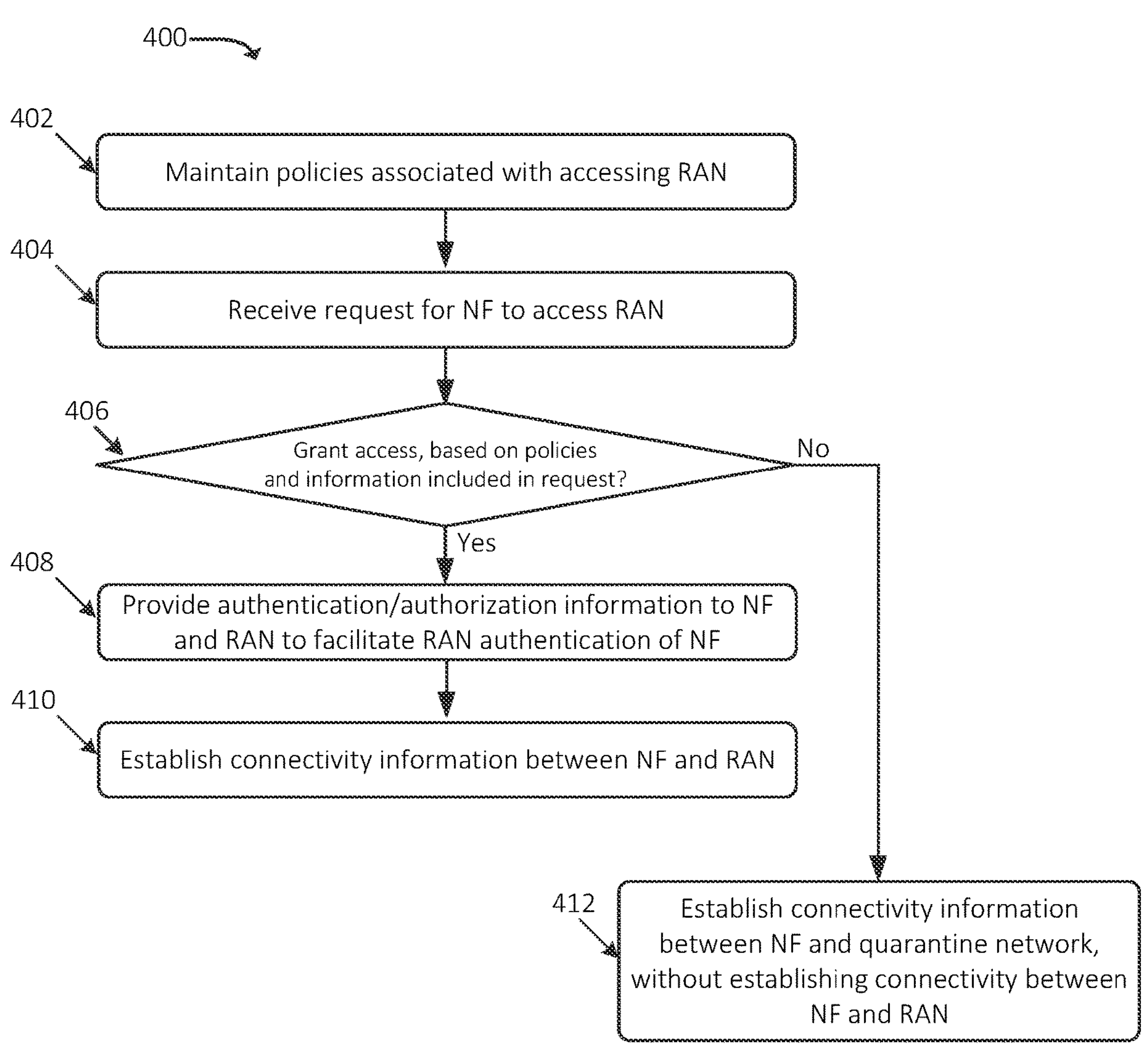
FIG. 4 illustrates an example process for securely providing connectivity between an authorized NF and a RAN, in accordance with some embodiments.

FIG. 4 illustrates an example process 400 for securely providing connectivity between an authorized NF and a RAN, in accordance with some embodiments. In some embodiments, some or all of process 400 may be performed by OSP 101. In some embodiments, one or more other devices may perform some or all of process 400 in concert with, and/or in lieu of, OSP 101.

As shown, process 400 may include maintaining (at 402) policies associated with accessing a RAN. For example, OSP 101 may maintain a set of criteria, policies, etc. indicating NFs, types of NFs. NF providers, etc. that are authorized to access (e.g., join) a RAN that is implemented in a containerized and/or modular manner, such as O-RAN 103. As discussed above, such policies may include NF attributes, NF identifiers, NF provider attributes, NF provider identifiers, location-based criteria, QoS-based criteria, and/or other suitable criteria or polices.

Process 400 may further include receiving (at 404) a request for a particular NF to access the RAN. For example, OSP 101 may receive a request from NF 105, or from some other suitable source, for NF 105 to access the RAN (e.g., O-RAN 103). The request may be, for example, a request for NF 105 to join the RAN as an NF of the RAN, which may include a request to communicate with one or more other NFs 107 that implement the RAN. The request may include attributes of NF 105, an identifier of NF 105, attributes of a provider of NF 105, and/or other suitable information.

Process 400 may additionally include determining (at 406) whether to grant the requested access, based on the policies and information included in the request. For example, OSP 101 may compare some or all of the information included in the request to the policies associated with access to the RAN. In the event that OSP 101 determines that access should be provided (at 406—YES), then OSP 101 may provide (at 408) authentication and/or authorization information to NF 105 and to the RAN, in order to facilitate an authentication of NF 105 by the RAN (e.g., where such information further indicates that NF 105 is authorized to access the RAN). For example, as discussed above, OSP 101 may generate or obtain a certificate, one or more keys, etc., and may provide such certificate, keys, etc. to NF 105. NF 105 and O-RAN 103 may utilize the certificate, one or more keys, etc. in an authentication procedure, such as a procedure in which NF 105 utilizes the certificate, one or more keys, etc., to decrypt or otherwise process a challenge message.

Process 400 may also include establishing (at 410) connectivity information between NF 105 and the RAN. For example, OSP 101 may receive an indication from the RAN after the RAN has authenticated NF 105 (e.g., as discussed above) that OSP 101 should establish the connectivity information. Additionally, or alternatively, OSP 101 may establish such connectivity information independently of receiving such indication. As discussed above, establishing the connectivity information may include selecting or assigning an address, such as an IP address, that is in a same address space as used by other NFs 107 of the RAN. As also discussed above, establishing the connectivity information may include configuring routing policies or other suitable information associated with a routing mechanism of the RAN to provide for the routing of communications to and/or from NF 105. In some embodiments, OSP 101 may act as a routing and/or communication proxy between NF 105 and the RAN. For example, OSP 101 may receive traffic from the RAN, which includes the address assigned to NF 105, and may route such traffic to NF 105. Similarly, OSP 101 may receive traffic from NF 105 that includes an address of one or more NFs 107 of the RAN, and may route such traffic toward such NFs 107 of the RAN.

If, on the other hand, OSP 101 determines (at 406-NO) that access should not be granted to NF 105, OSP 101 may forgo establishing connectivity between NF 105 and the RAN. In this manner, NF 105 may be unable to communicate with the RAN. For example, in the event that NF 105 attempts to output traffic to the RAN, via OSP 101, OSP 101 may reject such traffic without forwarding the traffic to the RAN. In some embodiments, when denying the access (at 406-NO), OSP 101 may establish (at 412) connectivity between NF 105 and quarantine network 109, which may be a separate network from the RAN (e.g., via which NF 105 may be unable to communicate with the RAN). In this manner, diagnostics, reconfiguration, etc. may be able to be performed with respect to NF 105 without providing access to the RAN.

Figure 5:
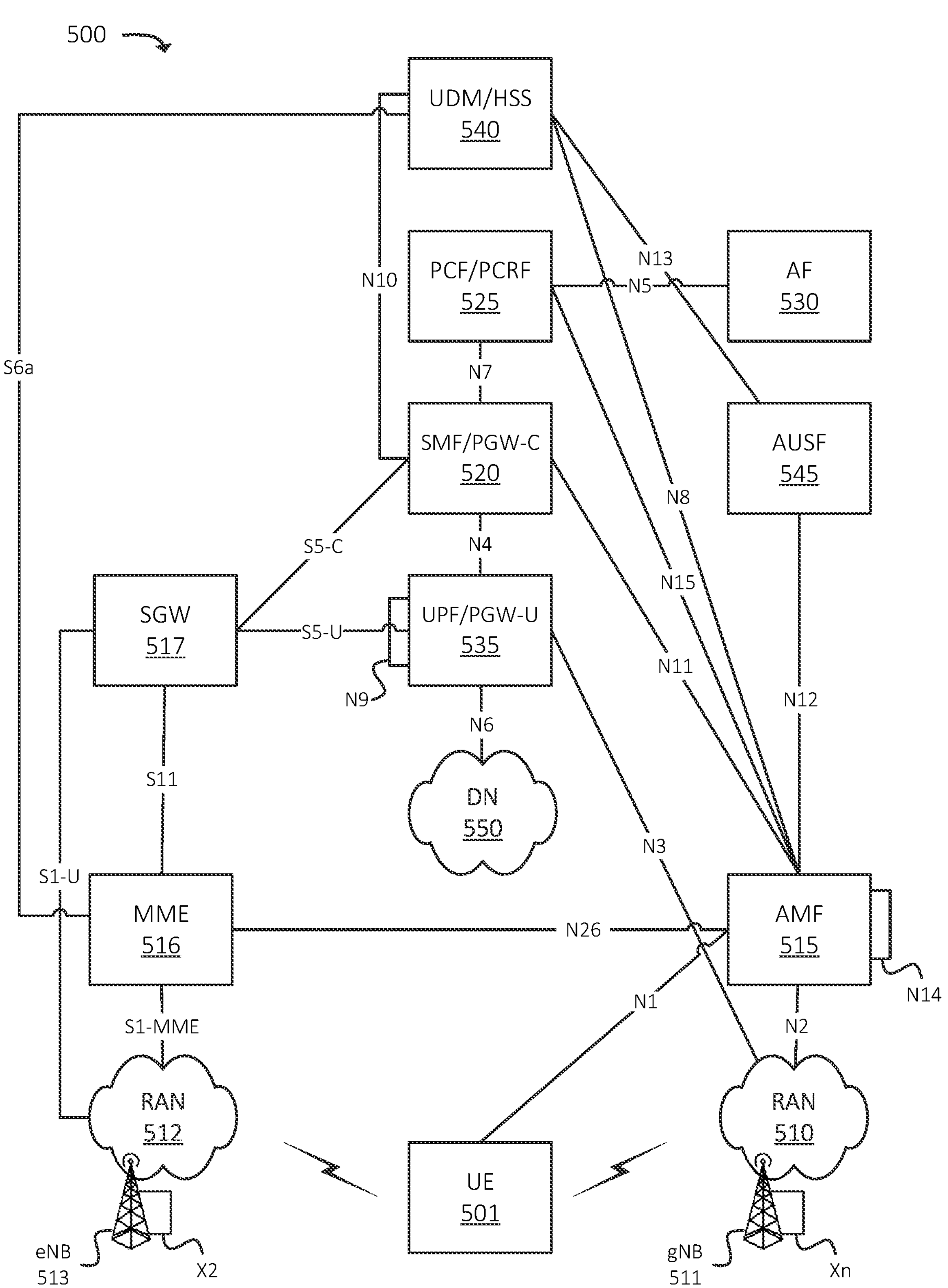
FIGS. 5 and 6 illustrate example environments in which one or more embodiments, described herein, may be implemented.

FIG. 5 illustrates an example environment 500, in which one or more embodiments may be implemented. In some embodiments, environment 500 may correspond to a Fifth Generation ("5G") network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 500 may represent or may include a 5G core ("5GC"). As shown, environment 500 may include UE 501, RAN 510 (which may include one or more Next Generation Node Bs ("gNBs") 511), RAN 512 (which may include one or more evolved Node Bs ("eNBs") 513), and various network functions such as Access and Mobility Management Function ("AMF") 515, Mobility Management Entity ("MME") 516, Serving Gateway ("SGW") 517, Session Management Function ("SMF")/Packet Data Network ("PDN") Gateway ("PGW")-Control plane function ("PGW-C") 520, Policy Control Function ("PCF")/Policy Charging and Rules Function ("PCRF") 525, Application Function ("AF") 530, User Plane Function ("UPF")/PGW-User plane function ("PGW-U") 535, Unified Data Management ("UDM")/Home Subscriber Server ("HSS") 540, and Authentication Server Function ("AUSF") 545. Environment 500 may also include one or more networks, such as Data Network ("DN") 550. Environment 500 may include one or more additional devices or systems communicatively coupled to one or more networks (e.g., DN 550).

The example shown in FIG. 5 illustrates one instance of each network component or function (e.g., one instance of SMF/PGW-C 520, PCF/PCRF 525, UPF/PGW-U 535, UDM/HSS 540, and/or AUSF 545). In practice, environment 500 may include multiple instances of such components or functions. For example, in some embodiments, environment 500 may include multiple "slices" of a core network, where each slice includes a discrete and/or logical set of network functions (e.g., one slice may include a first instance of AMF 515, SMF/PGW-C 520, PCF/PCRF 525, and/or UPF/PGW-U 535, while another slice may include a second instance of AMF 515, SMF/PGW-C 520, PCF/PCRF 525, and/or UPF/PGW-U 535). The different slices may provide differentiated levels of service, such as service in accordance with different Quality of Service ("QoS") parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. In some implementations, one or more devices of environment 500 may be physically integrated in, and/or may be physically attached to, one or more other devices of environment 500. Alternatively, or additionally, one or more of the devices of environment 500 may perform one or more network functions described as being performed by another one or more of the devices of environment 500.

Elements of environment 500 may interconnect with each other and/or other devices via wired connections, wireless connections, or a combination of wired and wireless connections. Examples of interfaces or communication pathways between the elements of environment 500, as shown in FIG. 5, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 5, such as Service-Based Interfaces ("SBIs"), including an Namf interface, an Nudm interface, an Npcf interface, an Nupf interface, an Nnef interface, an Nsmf interface, and/or one or more other SBIs.

UE 501 may include a computation and communication device, such as a wireless mobile communication device that is capable of communicating with RAN 510, RAN 512, and/or DN 550. UE 501 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 501 may send traffic to and/or receive traffic (e.g., user plane traffic) from DN 550 via RAN 510, RAN 512, and/or UPF/PGW-U 535.

RAN 510 may be, or may include, a 5G RAN that includes one or more base stations (e.g., one or more gNBs 511), via which UE 501 may communicate with one or more other elements of environment 500. UE 501 may communicate with RAN 510 via an air interface (e.g., as provided by gNB 511). For instance, RAN 510 may receive traffic (e.g., user plane traffic such as voice call traffic, data traffic, messaging traffic, etc.) from UE 501 via the air interface, and may communicate the traffic to UPF/PGW-U 535 and/or one or more other devices or networks. Further, RAN 510 may receive signaling traffic, control plane traffic, etc. from UE 501 via the air interface, and may communicate such signaling traffic, control plane traffic, etc. to AMF 515 and/or one or more other devices or networks. Additionally, RAN 510 may receive traffic intended for UE 501 (e.g., from UPF/PGW-U 535, AMF 515, and/or one or more other devices or networks) and may communicate the traffic to UE 501 via the air interface.

RAN 512 may be, or may include, a LTE RAN that includes one or more base stations (e.g., one or more eNBs 513), via which UE 501 may communicate with one or more other elements of environment 500. UE 501 may communicate with RAN 512 via an air interface (e.g., as provided by eNB 513). For instance, RAN 512 may receive traffic (e.g., user plane traffic such as voice call traffic, data traffic, messaging traffic, signaling traffic, etc.) from UE 501 via the air interface, and may communicate the traffic to UPF/PGW-U 535 (e.g., via SGW 517) and/or one or more other devices or networks. Further, RAN 512 may receive signaling traffic, control plane traffic, etc. from UE 501 via the air interface, and may communicate such signaling traffic, control plane traffic, etc. to MME 516 and/or one or more other devices or networks. Additionally, RAN 512 may receive traffic intended for UE 501 (e.g., from UPF/PGW-U 535, MME 516, SGW 517, and/or one or more other devices or networks) and may communicate the traffic to UE 501 via the air interface.

AMF 515 may include one or more devices, systems, VNFs, CNFs, etc., that perform operations to register UE 501 with the 5G network, to establish bearer channels associated with a session with UE 501, to hand off UE 501 from the 5G network to another network, to hand off UE 501 from the other network to the 5G network, manage mobility of UE 501 between RANs 510 and/or gNBs 511, and/or to perform other operations. In some embodiments, the 5G network may include multiple AMFs 515, which communicate with each other via the N14 interface (denoted in FIG. 5 by the line marked "N14" originating and terminating at AMF 515).

MME 516 may include one or more devices, systems, VNFs, CNFs, etc., that perform operations to register UE 501 with the EPC, to establish bearer channels associated with a session with UE 501, to hand off UE 501 from the EPC to another network, to hand off UE 501 from another network to the EPC, manage mobility of UE 501 between RANs 512 and/or eNBs 513, and/or to perform other operations.

SGW 517 may include one or more devices, systems, VNFs, CNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, CNFs, etc., that gather, process, store, and/or provide information in a manner described herein. SMF/PGW-C 520 may, for example, facilitate the establishment of communication sessions on behalf of UE 501. In some embodiments, the establishment of communications sessions may be performed in accordance with one or more policies provided by PCF/PCRF 525.

PCF/PCRF 525 may include one or more devices, systems, VNFs, CNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, CNFs, etc., that receive, store, and/or provide information that may be used in determining parameters (e.g., quality of service parameters, charging parameters, or the like) for certain applications.

UPF/PGW-U 535 may include one or more devices, systems, VNFs, CNFs, etc., that receive, store, and/or provide data (e.g., user plane data). For example, UPF/PGW-U 535 may receive user plane data (e.g., voice call traffic, data traffic, etc.), destined for UE 501, from DN 550, and may forward the user plane data toward UE 501 (e.g., via RAN 510, SMF/PGW-C 520, and/or one or more other devices). In some embodiments, multiple instances of UPF/PGW-U 535 may be deployed (e.g., in different geographical locations), and the delivery of content to UE 501 may be coordinated via the N9 interface (e.g., as denoted in FIG. 5 by the line marked "N9" originating and terminating at UPF/PGW-U 535). Similarly, UPF/PGW-U 535 may receive traffic from UE 501 (e.g., via RAN 510, RAN 512, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

UDM/HSS 540 and AUSF 545 may include one or more devices, systems, VNFs, CNFs, etc., that manage, update, and/or store, in one or more memory devices associated with AUSF 545 and/or UDM/HSS 540, profile information associated with a subscriber. AUSF 545 and/or UDM/HSS 540 may perform authentication, authorization, and/or accounting operations associated with the subscriber and/or a communication session with UE 501.

DN 550 may include one or more wired and/or wireless networks. For example, DN 550 may include an IP-based PDN, a wide area network ("WAN") such as the Internet, a private enterprise network, and/or one or more other networks. UE 501 may communicate, through DN 550, with data servers, other UEs 501, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 501 may communicate.

Figure 6:
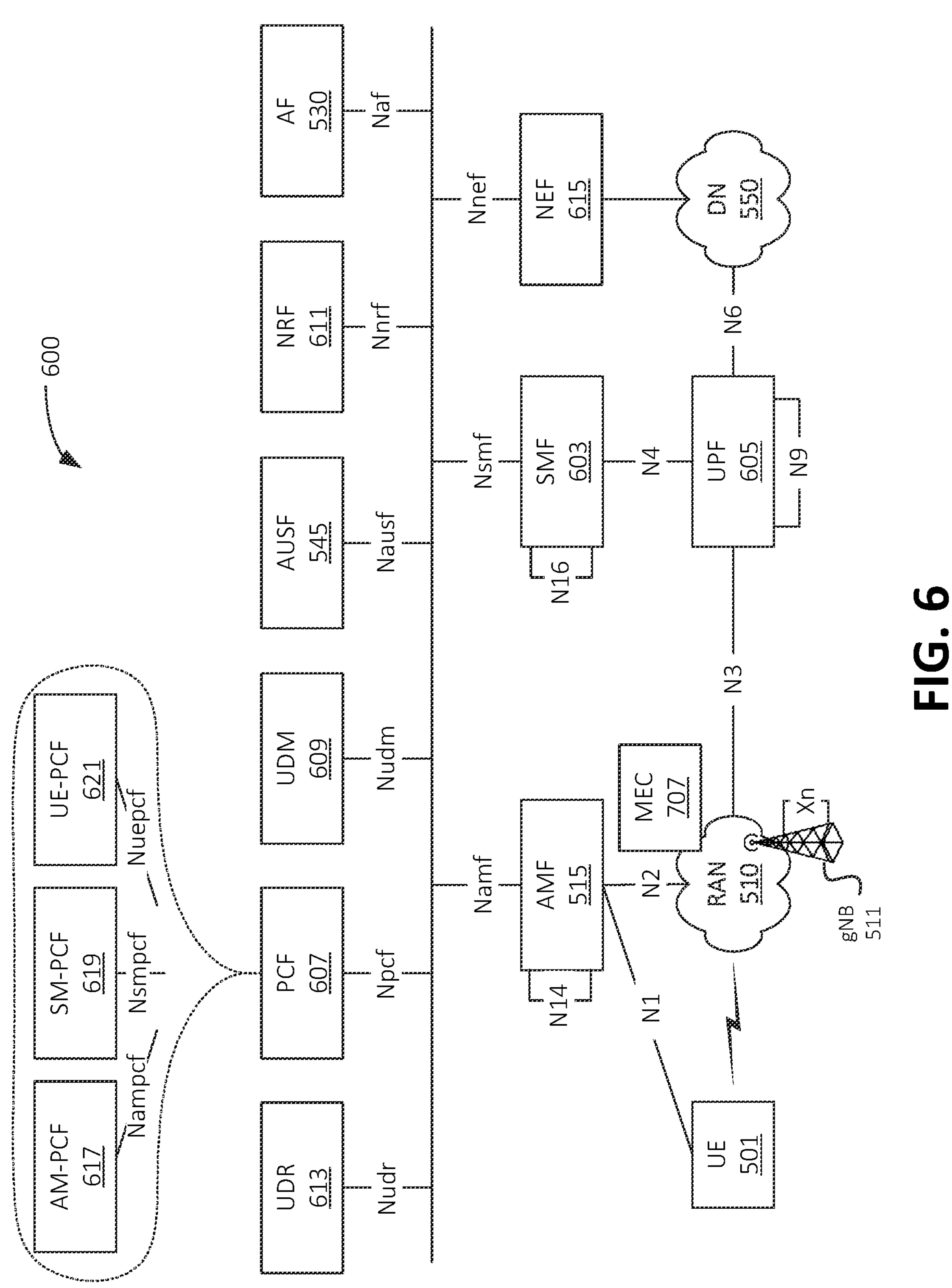

FIG. 6 illustrates another example environment 600, in which one or more embodiments may be implemented. In some embodiments, environment 600 may correspond to a 5G network, and/or may include elements of a 5G network. In some embodiments, environment 600 may correspond to a 5G SA architecture. In some embodiments, environment 600 may include a 5GC, in which 5GC network elements perform one or more operations described herein.

As shown, environment 600 may include UE 501, RAN 510 (which may include one or more gNBs 511 or other types of wireless network infrastructure) and various network functions, which may be implemented as VNFs, CNFs, etc. Such network functions may include AMF 515, SMF 603, UPF 605, PCF 607, UDM 609, AUSF 545, Network Repository Function ("NRF") 611, AF 530, Unified Data Repository ("UDR") 613, and Network Exposure Function ("NEF") 615. Environment 600 may also include or may be communicatively coupled to one or more networks, such as Data Network DN 550.

The example shown in FIG. 6 illustrates one instance of each network component or function (e.g., one instance of SMF 603, UPF 605, PCF 607, UDM 609, AUSF 545, etc.). In practice, environment 600 may include multiple instances of such components or functions. For example, in some embodiments, environment 600 may include multiple "slices" of a core network, where each slice includes a discrete and/or logical set of network functions (e.g., one slice may include a first instance of SMF 603, PCF 607, UPF 605, etc., while another slice may include a second instance of SMF 603, PCF 607, UPF 605, etc.). Additionally, or alternatively, one or more of the network functions of environment 600 may implement multiple network slices. The different slices may provide differentiated levels of service, such as service in accordance with different QoS parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include interfaces shown in FIG. 6 and/or one or more interfaces not explicitly shown in FIG. 6. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 600 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 515), an Nudm interface (e.g., indicating communications to be routed to UDM 609), an Npcf interface, an Nupf interface, an Nnef interface, an Nsmf interface, an Nnrf interface, an Nudr interface, an Naf interface, and/or one or more other SBIs.

UPF 605 may include one or more devices, systems, VNFs, CNFs, etc., that receive, route, process, and/or forward traffic (e.g., user plane traffic). As discussed above, UPF 605 may communicate with UE 501 via one or more communication sessions, such as PDU sessions. Such PDU sessions may be associated with a particular network slice or other suitable QoS parameters, as noted above. UPF 605 may receive downlink user plane traffic (e.g., voice call traffic, data traffic, etc. destined for UE 501) from DN 550, and may forward the downlink user plane traffic toward UE 501 (e.g., via RAN 510). In some embodiments, multiple UPFs 605 may be deployed (e.g., in different geographical locations), and the delivery of content to UE 501 may be coordinated via the N9 interface. Similarly, UPF 605 may receive uplink traffic from UE 501 (e.g., via RAN 510), and may forward the traffic toward DN 550. In some embodiments, UPF 605 may implement, may be implemented by, may be communicatively coupled to, and/or may otherwise be associated with UPF/PGW-U 535. In some embodiments, UPF 605 may communicate (e.g., via the N4 interface) with SMF 603, regarding user plane data processed by UPF 605 (e.g., to provide analytics or reporting information, to receive policy and/or authorization information, etc.).

PCF 607 may include one or more devices, systems, VNFs, CNFs, etc., that aggregate, derive, generate, etc. policy information associated with the 5GC and/or UEs 501 that communicate via the 5GC and/or RAN 510. PCF 607 may receive information regarding policies and/or subscriptions from one or more sources, such as subscriber databases (e.g., UDM 609, UDR 613, etc.), and/or from one or more users such as, for example, an administrator associated with PCF 607. In some embodiments, the functionality of PCF 607 may be split into multiple network functions or subsystems, such as access and mobility PCF ("AM-PCF") 617, session management PCF ("SM-PCF") 619, UE PCF ("UE-PCF") 621, and so on. Such different "split" PCFs may be associated with respective SBIs (e.g., AM-PCF 617 may be associated with an Nampcf SBI, SM-PCF 619 may be associated with an Nsmpcf SBI, UE-PCF 621 may be associated with an Nuepcf SBI, and so on) via which other network functions may communicate with the split PCFs. The split PCFs may maintain information regarding policies associated with different devices, systems, and/or network functions.

NRF 611 may include one or more devices, systems, VNFs, CNFs, etc. that maintain routing and/or network topology information associated with the 5GC. For example, NRF 611 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 613 may include one or more devices, systems, VNFs, CNFs, etc. that provide user and/or subscriber information, based on which PCF 607 and/or other elements of environment 600 may determine access policies, QoS policies, charging policies, or the like. In some embodiments, UDR 613 may receive such information from UDM 609 and/or one or more other sources.

NEF 615 include one or more devices, systems, VNFs, CNFs, etc. that provide access to information, application programming interfaces ("APIs"), and/or other operations or mechanisms of the 5GC to devices or systems that are external to the 5GC. NEF 615 may maintain authorization and/or authentication information associated with such external devices or systems, such that NEF 615 is able to provide information, that is authorized to be provided, to the external devices or systems. Such information may be received from other network functions of the 5GC (e.g., as authorized by an administrator or other suitable entity associated with the 5GC), such as SMF 603, UPF 605, a charging function ("CHF") of the 5GC, and/or other suitable network function. NEF 615 may communicate with external devices or systems via DN 550 and/or other suitable communication pathways.

While environment 600 is described in the context of a 5GC, as noted above, environment 600 may, in some embodiments, include or implement one or more other types of core networks. For example, in some embodiments, environment 600 may be or may include a converged packet core, in which one or more elements may perform some or all of the functionality of one or more 5GC network functions and/or one or more EPC network functions. For example, in some embodiments, AMF 515 may include, may implement, may be implemented by, and/or may otherwise be associated with MME 516; SMF 603 may include, may implement, may be implemented by, and/or may otherwise be associated with SGW 517; PCF 607 may include, may implement, may be implemented by, and/or may otherwise be associated with a PCRF; NEF 615 may include, may implement, may be implemented by, and/or may otherwise be associated with a Service Capability Exposure Function ("SCEF"); and so on.

Figure 7:
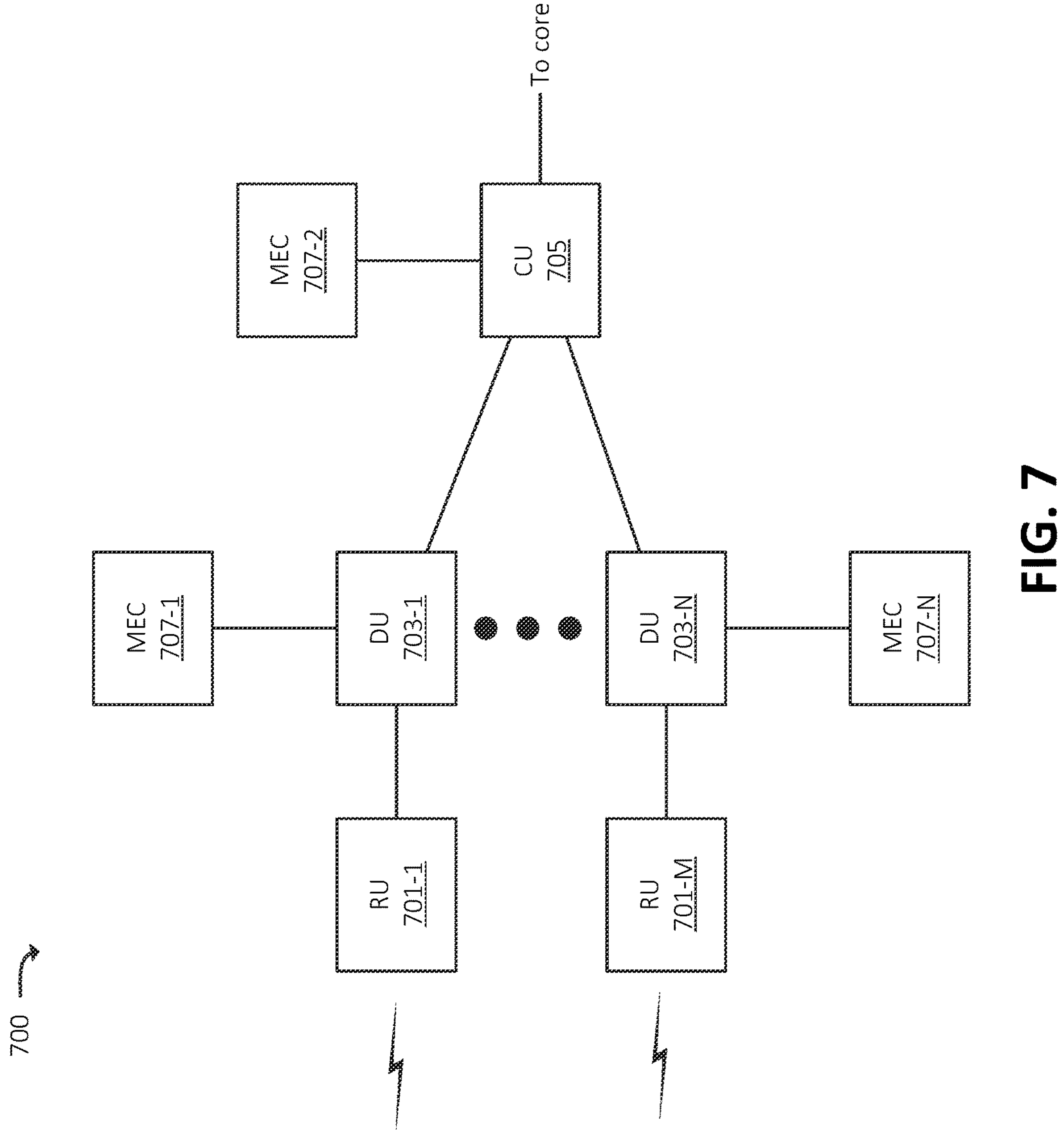
FIG. 7 illustrates an example arrangement of a radio access network ("RAN"), in accordance with some embodiments.

FIG. 7 illustrates an example RAN environment 700, which may be included in and/or implemented by one or more RANs (e.g., RAN 510 or some other RAN). In some embodiments, O-RAN 103 may include, may implement, or may be implemented by some or all of the elements of RAN environment 700. In some embodiments, a particular RAN 510 may include one RAN environment 700. In some embodiments, a particular RAN 510 may include multiple RAN environments 700. In some embodiments, RAN environment 700 may correspond to a particular gNB 511 of RAN 510. In some embodiments, RAN environment 700 may correspond to multiple gNBs 511. In some embodiments, RAN environment 700 may correspond to one or more other types of base stations of one or more other types of RANs. As shown, RAN environment 700 may include CU 705, one or more DUs 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 515 and/or UPF 605). In the uplink direction (e.g., for traffic from UEs 501 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 501, and may determine which DU(s) 703 should receive the downlink traffic. DU 703 may include one or more devices that transmit traffic between a core network (e.g., via CU 705) and UE 501 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 501.

RU 701 may include hardware circuitry (e.g., one or more RF transceivers, antennas, radios, and/or other suitable hardware) to communicate wirelessly (e.g., via an RF interface) with one or more UEs 501, one or more other DUs 703 (e.g., via RUs 701 associated with DUs 703), and/or any other suitable type of device. In the uplink direction, RU 701 may receive traffic from UE 501 and/or another DU 703 via the RF interface and may provide the traffic to DU 703. In the downlink direction, RU 701 may receive traffic from DU 703, and may provide the traffic to UE 501 and/or another DU 703.

One or more elements of RAN environment 700 may, in some embodiments, be communicatively coupled to one or more Multi-Access/Mobile Edge Computing ("MEC") devices, referred to sometimes herein simply as a "MECs," 707. For example, DU 703-1 may be communicatively coupled to MEC 707-1, DU 703-N may be communicatively coupled to MEC 707-N, CU 705 may be communicatively coupled to MEC 707-2, and so on. MECs 707 may include hardware resources (e.g., configurable or provisionable hardware resources) that may be configured to provide services and/or otherwise process traffic to and/or from UE 501, via a respective RU 701.

For example, DU 703-1 may route some traffic, from UE 501, to MEC 707-1 instead of to a core network via CU 705. MEC 707-1 may process the traffic, perform one or more computations based on the received traffic, and may provide traffic to UE 501 via RU 701-1. In some embodiments, MEC 707 may include, and/or may implement, some or all of the functionality described above with respect to UPF 605, AF 530, and/or one or more other devices, systems, VNFs, CNFs, etc. In this manner, ultra-low latency services may be provided to UE 501, as traffic does not need to traverse DU 703, CU 705, links between DU 703 and CU 705, and an intervening backhaul network between RAN environment 700 and the core network.

Figure 8:
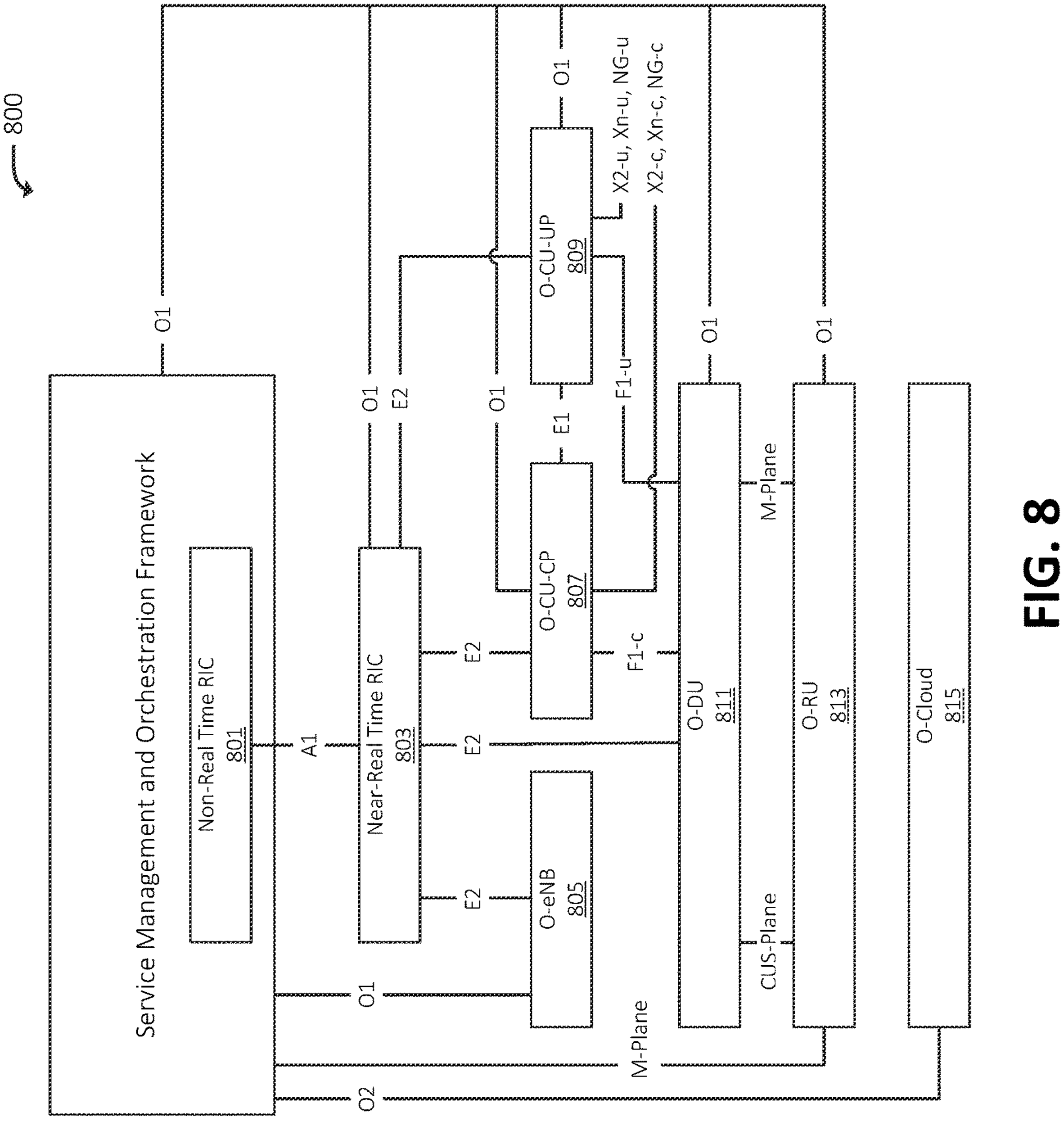
FIG. 8 illustrates an example arrangement of an O-RAN environment in which one or more embodiments, described herein, may be implemented.

FIG. 8 illustrates an example O-RAN environment 800, which may correspond to RAN 510, RAN 512, and/or RAN environment 700. For example, RAN 510, RAN 512, and/or RAN environment 700 may include one or more instances of O-RAN environment 800, and/or one or more instances of O-RAN environment 800 may implement RAN 510, RAN 512, RAN environment 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 707.

Non-Real Time RIC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time RIC 803 for implementation.

O-eNB 805 may perform functions similar to those described above with respect to eNB 513. For example, O-eNB 805 may facilitate wireless communications between UE 1uu and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 707, which may provide services, and may be communicatively coupled, to O-CU-CP 807, O-CU-UP 809, O-DU 811, and/or O-RU 813 (e.g., via an O1 and/or O2 interface).

Figure 9:
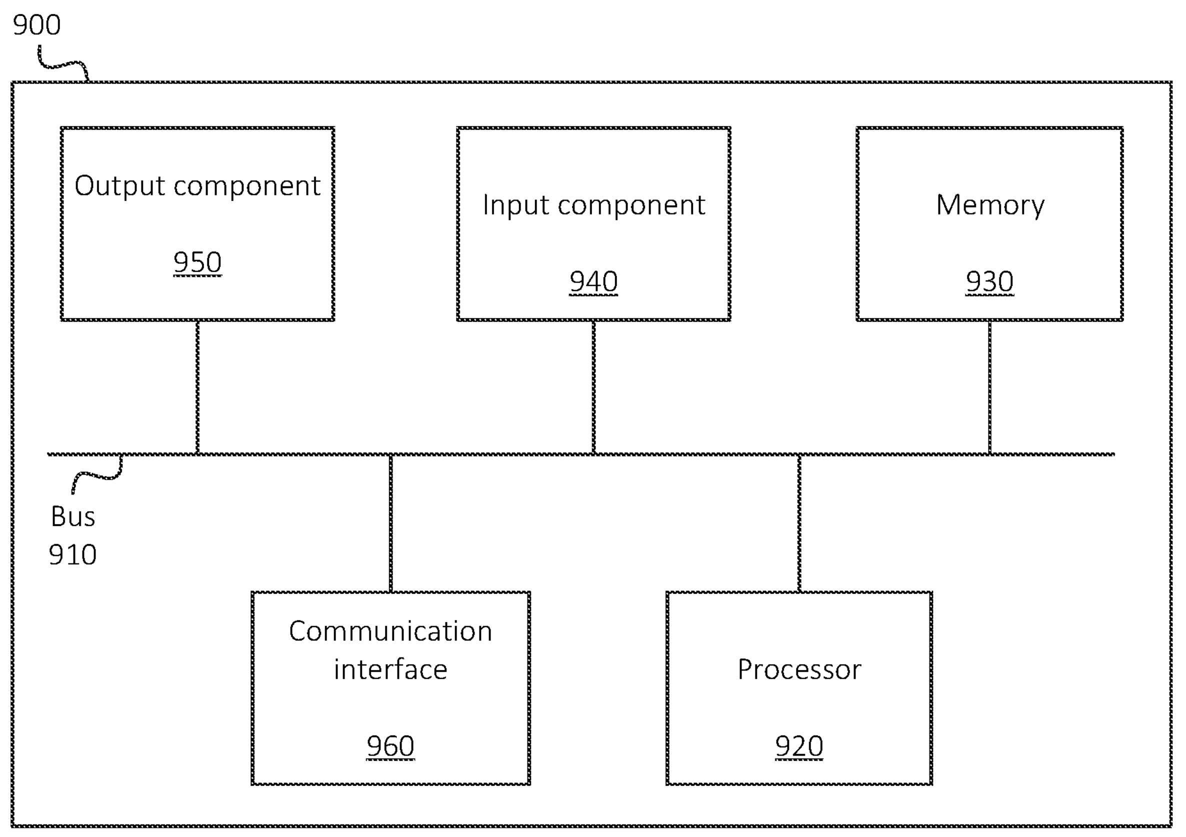
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, a set of provisioned hardware resources of a cloud computing system, or other suitable type of hardware that interprets and/or executes instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1C and 2-4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

maintain a set of policies associated with accessing a radio access network ("RAN") of a wireless network, wherein the RAN includes a plurality of network functions ("NFs");

receive a request to add a particular NF to the RAN, wherein the request includes information associated with the particular NF, wherein the information associated with the particular NF includes at least one of:

an identifier of the particular NF, or one or more attributes of the particular NF;

determine, based on the set of policies and the information associated with the particular NF included in the request, whether to grant the request to add the NF to the RAN;

establish, when determining that the request should be granted, connectivity between the particular NF and one or more NFs of the plurality of NFs of the RAN, wherein establishing the connectivity includes:

assigning a particular address to the particular NF in a same address space that is associated with the one or more NFs;

routing traffic, addressed to the particular address, to the particular NF; and routing traffic, received from the particular NF, to the one or more NFs of the RAN; and forgo establishing, when determining that the request should not be granted, connectivity between the particular NF and the one or more NFs of the RAN.

2. The device of claim 1, wherein the one or more processors are configured to:

establish, when determining that the request should not be granted, connectivity between the particular NF and a network that is separate from the RAN, wherein the particular NF is unable to communicate with the RAN via the network that is separate from the RAN.

3. The device of claim 1, wherein the RAN includes an Open RAN ("O-RAN") that includes one or more other NFs.

4. The device of claim 3, wherein the request for the particular NF to access the O-RAN includes a request to communicate with at least one of the one or more other NFs of the O-RAN.

5. The device of claim 1, wherein the one or more processors are further configured to:

provide, when determining that the request should be granted, one or more keys or certificates to the particular NF, wherein the particular NF and the RAN use the one or more keys or certificates to perform an authentication procedure in which the particular NF is authenticated.

6. The device of claim 1, wherein the particular address includes a particular Internet Protocol ("IP") address that is in a same address space used by the RAN for NFs that implement the RAN.

7. The device of claim 1, wherein the one or more processors are further configured to:

register with the RAN as a security proxy for the RAN, wherein the registering includes receiving the set of policies.

8. A non-transitory computer-readable medium, storing a plurality of processor-executable instructions to:

maintain a set of policies associated with accessing a radio access network ("RAN") of a wireless network, wherein the RAN includes a plurality of network functions ("NFs");

receive a request to add a particular NF to access the RAN, wherein the request includes information associated with the particular NF, wherein the information associated with the particular NF includes at least one of:

an identifier of the particular NF, or one or more attributes of the particular NF;

determine, based on the set of policies and the information associated with the particular NF included in the request, whether to grant the request to add the NF to the RAN;

establish, when determining that the request should be granted, connectivity between the particular NF and one or more NFs of the plurality of NEs of the RAN, wherein establishing the connectivity includes:

assigning a particular address to the particular NF in a same address space that is associated with the one or more NFs;

routing traffic, addressed to the particular address, to the particular NF; and routing traffic, received from the particular NF, to the one or more NFs of the RAN; and forgo establishing, when determining that the request should not be granted, connectivity between the particular NF and the one or more NFs of the RAN.

9. The non-transitory computer-readable medium of claim 8, wherein the plurality of processor-executable instructions further include processor-executable instructions to:

establish, when determining that the request should not be granted, connectivity between the particular NF and a network that is separate from the RAN, wherein the particular NF is unable to communicate with the RAN via the network that is separate from the RAN.

10. The non-transitory computer-readable medium of claim 8, wherein the RAN includes an Open RAN ("O-RAN") that includes one or more other NFs.

11. The non-transitory computer-readable medium of claim 10, wherein the request for the particular NF to access the O-RAN includes a request to communicate with at least one of the one or more other NFs of the O-RAN.

12. The non-transitory computer-readable medium of claim 8, wherein the plurality of processor-executable instructions further include processor-executable instructions to:

provide, when determining that the request should be granted, one or more keys or certificates to the particular NF, wherein the particular NF and the RAN use the one or more keys or certificates to perform an authentication procedure in which the particular NF is authenticated.

13. The non-transitory computer-readable medium of claim 8, wherein the particular address includes a particular Internet Protocol ("IP") address that is in a same address space used by the RAN for NFs that implement the RAN.

14. The non-transitory computer-readable medium of claim 8, wherein the plurality of processor-executable instructions further include processor-executable instructions to:

register with the RAN as a security proxy for the RAN, wherein the registering includes receiving the set of policies.

15. A method, comprising:

maintaining a set of policies associated with accessing a radio access network ("RAN") of a wireless network, wherein the RAN includes a plurality of network functions ("NFs");

receiving a request to add a particular NF to access the RAN, wherein the request includes information associated with the particular NF, wherein the information associated with the particular NF includes at least one of:

an identifier of the particular NF, or one or more attributes of the particular NF;

determining, based on the set of policies and the information associated with the particular NF included in the request, whether to grant the request to access add the NF to the RAN;

establishing, when determining that the request should be granted, connectivity between the particular NF and one or more NFs of the plurality of NFs of the RAN, wherein establishing the connectivity includes:

assigning a particular address to the particular NF in a same address space that is associated with the one or more NFs;

routing traffic, addressed to the particular address, to the particular NF; and routing traffic, received from the particular NF, to the one or more NFs of the RAN; and forgoing establishing, when determining that the request should not be granted, connectivity between the particular NF and the one or more NFs of the RAN.

16. The method of claim 15, further comprising:

establishing, when determining that the request should not be granted, connectivity between the particular NF and a network that is separate from the RAN, wherein the particular NF is unable to communicate with the RAN via the network that is separate from the RAN.

17. The method of claim 15, wherein the RAN includes an Open RAN ("O-RAN") that includes one or more other NFs, wherein the request for the particular NF to access the O-RAN includes a request to communicate with at least one of the one or more other NFs of the O-RAN.

18. The method of claim 15, further comprising:

providing, when determining that the request should be granted, one or more keys or certificates to the particular NF, wherein the particular NF and the RAN use the one or more keys or certificates to perform an authentication procedure in which the particular NF is authenticated.

19. The method of claim 15, wherein the particular address includes a particular Internet Protocol ("IP") address that is in a same address space used by the RAN for NFs that implement the RAN.

20. The method of claim 15, further comprising:

registering with the RAN as a security proxy for the RAN, wherein the registering includes receiving the set of policies.

* * * * *